United States Patent
Lee et al.

(10) Patent No.: US 9,804,867 B2
(45) Date of Patent: Oct. 31, 2017

(54) APPARATUS AND METHOD FOR MANAGING VIRTUAL MACHINE IN MOBILE COMMUNICATION SYSTEM USING AN EDGE CLOUD MANAGEMENT CONTROLLER

(71) Applicant: Samsung Electronics Co., Ltd., Gyeonggi-do (KR)

(72) Inventors: Ji-Cheol Lee, Gyeonggi-do (KR); Jin-Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 531 days.

(21) Appl. No.: 14/062,259

(22) Filed: Oct. 24, 2013

(65) Prior Publication Data

US 2014/0115583 A1    Apr. 24, 2014

(30) Foreign Application Priority Data

Oct. 24, 2012 (KR) .................. 10-2012-0118465

(51) Int. Cl.
*G06F 9/455* (2006.01)
*H04W 4/00* (2009.01)
*H04W 72/04* (2009.01)

(52) U.S. Cl.
CPC ........ *G06F 9/45533* (2013.01); *H04W 4/003* (2013.01); *G06F 2009/45562* (2013.01); *H04W 72/04* (2013.01)

(58) Field of Classification Search
None
See application file for complete search history.

(56) References Cited

U.S. PATENT DOCUMENTS

| | | | | |
|---|---|---|---|---|
| 7,146,306 | B2* | 12/2006 | Whitney | G06F 9/5077 439/676 |
| 7,526,300 | B2* | 4/2009 | Choi | H04L 12/5895 455/414.1 |
| 8,873,398 | B2* | 10/2014 | Kempf | 370/216 |
| 2006/0212529 | A1* | 9/2006 | Choi | H04L 12/5895 709/206 |
| 2009/0170426 | A1* | 7/2009 | Jung | H04W 8/24 455/7 |

(Continued)

*Primary Examiner* — Abu Ghaffari
(74) *Attorney, Agent, or Firm* — The Farrell Law Firm, P.C.

(57) ABSTRACT

Methods and apparatus are provided for managing a Virtual Machine (VM) in a mobile communication system. Upon receiving a VM provisioning request message from a $3^{rd}$ party entity, an Edge Cloud-Radio Access Network (EC-RAN) VM control command message, indicating that the Edge Cloud Management Controller (ECMC) commands a VM provisioning, is transmitted to an Edge Cloud Manager (ECM). An EC-RAN VM control command Ack message is received, including information indicating whether a VM host, which the EC-RAN VM control command message targets, accepts or rejects the EC-RAN VM control command message, and including a VM instance ID allocated to the VM host. A VM instance corresponding to the VM instance ID is registered and a status of the VM instance is set as an allocation status, after the EC-RAN VM control command Ack message is received from the ECM.

18 Claims, 11 Drawing Sheets

(56) References Cited

U.S. PATENT DOCUMENTS

| | | | |
|---|---|---|---|
| 2009/0228589 A1* | 9/2009 | Korupolu | H04L 67/1097 709/226 |
| 2009/0249472 A1* | 10/2009 | Litvin | H04L 63/0263 726/14 |
| 2009/0300607 A1* | 12/2009 | Ferris | G06F 9/45558 718/1 |
| 2010/0100881 A1* | 4/2010 | Shigeta | G06F 11/2247 718/1 |
| 2010/0146504 A1* | 6/2010 | Tang | G06F 9/45537 718/1 |
| 2010/0217747 A1* | 8/2010 | Vitanov | G06F 9/4443 707/621 |
| 2011/0055714 A1* | 3/2011 | Vemulapalli | G06F 9/5077 715/739 |
| 2011/0055824 A1 | 3/2011 | Benari | |
| 2011/0090911 A1* | 4/2011 | Hao | H04L 12/4633 370/395.53 |
| 2011/0153838 A1* | 6/2011 | Belkine | G06F 9/505 709/227 |
| 2011/0167473 A1 | 7/2011 | Evans et al. | |
| 2011/0185355 A1* | 7/2011 | Chawla | G06F 9/5077 718/1 |
| 2012/0030349 A1* | 2/2012 | Sugai | G06F 9/5077 709/224 |
| 2012/0036515 A1* | 2/2012 | Heim | G06F 9/5088 718/105 |
| 2012/0147894 A1* | 6/2012 | Mulligan | G06F 9/45533 370/395.53 |
| 2012/0226740 A1* | 9/2012 | Nath | H04L 67/125 709/203 |
| 2012/0246645 A1* | 9/2012 | Iikura | G06F 8/61 718/1 |
| 2012/0300615 A1* | 11/2012 | Kempf | H04L 9/5077 370/216 |
| 2013/0054763 A1* | 2/2013 | Van Der Merwe | H04W 8/12 709/220 |
| 2013/0086202 A1* | 4/2013 | Connelly | H04L 67/10 709/217 |
| 2013/0183991 A1* | 7/2013 | Bosch | H04W 72/04 455/450 |
| 2013/0339949 A1* | 12/2013 | Spiers | G06F 9/5077 718/1 |
| 2014/0006347 A1* | 1/2014 | Qureshi | G06F 21/10 707/621 |
| 2014/0098813 A1* | 4/2014 | Mishra | H04L 12/185 370/390 |
| 2014/0337940 A1* | 11/2014 | Slavov | H04W 8/26 726/5 |

* cited by examiner

APPARATUS AND METHOD FOR MANAGING VIRTUAL MACHINE IN MOBILE COMMUNICATION SYSTEM USING AN EDGE CLOUD MANAGEMENT CONTROLLER

PRIORITY

This application claims priority under 35 U.S.C. §119(a) to a Korean Patent Application filed in the Korean Intellectual Property Office on Oct. 24, 2012 and assigned Ser. No. 10-2012-0118465, the entire disclosure of which is incorporated herein by reference.

BACKGROUND OF THE INVENTION

1. Field of the Invention

The present invention relates generally to a mobile communication system and, more particularly, to an apparatus and method for managing a Virtual Machine (VM) in the mobile communication system.

2. Description of the Related Art

FIG. 1 is a diagram illustrating an end point hosted hypervisor management process in a mobile communication system.

Referring to FIG. 1, the mobile communication system includes a relay+image repository 223, and a computer 224. There are three VMs 220, 221, 222 in the relay+image repository 223. The computer 224 includes a vAgent 225 that accesses the computer 224 in order to reimage the computer 224. The computer 224 includes a current VM. The computer 224 includes a storage 227, e.g., a disk. A new VM 230 is installed in the computer 224 and VM configuration information 231, a boot menu, and devices are setup.

The vAgent 225, which is in a VM host in FIG. 1, i.e., the computer 224, performs a management operation for a plurality of VMs that operate on the VM host. The management operation for the plurality of VMs includes, for example, a VM install operation, a replacement operation, a snapshot/rollback operation, a pause/resume operation, etc.

FIG. 2 schematically illustrates a Graphic User Interface (GUI) of an automatic install process of a virtualization host in a mobile communication system.

In FIG. 2, a screen shot indicates a Graphic User Interface (GUI) of a virtual management system, and the vAgent 225, as described in FIG. 1, may remotely manage a VM using the GUI.

In FIG. 2, reference numerals 301 and 302 indicate display areas, reference numeral 303 indicates a host, reference numeral 304 indicates general parameters, reference numeral 305 indicates VMs, reference numeral 306 indicates a network interface, reference numeral 307 indicates a device name, reference numeral 308 indicates a logical network/physical network name, reference numeral 309 indicates an address, i.e., an Internet Protocol (IP) address, and reference numeral 310 indicates a Medium Access Control (MAC) address.

As illustrated in FIGS. 1 and 2, a VM host may remotely manage a VM using a vAgent.

In a mobile communication system, if VM hosts are distributed by region, there is no consideration of a case in which a VM machine, which a $3^{rd}$ party entity intends to serve, is installed at a specific region.

Further, VM hosts in a Node B have insufficient capacities. If a VM of the $3^{rd}$ party entity is deployed, the VM of the $3^{rd}$ party entity continuously operates even though there is no User Equipment (UE), which uses a server that is on the VM of the $3^{rd}$ party entity. Thus, resources are continuously consumed. Finally, resource waste occurs due to unnecessary resource consumption.

SUMMARY OF THE INVENTION

The present invention has been made to address at least the above problems and/or disadvantages and to provide at least the advantages described below. An aspect of the present invention provides an apparatus and a method for managing a VM in a mobile communication system.

Another aspect of the present invention provides an apparatus and a method for managing a VM, thereby increasing resource efficiency in a mobile communication system.

An additional aspect of the present invention provides an apparatus and a method for managing a VM, thereby controlling an operation of a VM according to whether a UE accesses a server, which is located at the VM in a mobile communication system.

In accordance with an aspect of an embodiment of the present invention, a method is provided for managing a VM by an Edge Cloud Management Controller (ECMC) in a mobile communication system. Upon receiving a VM provisioning request message from a $3^{rd}$ party entity, a first Edge Cloud-Radio Access Network (EC-RAN) VM control command message, indicating that the ECMC commands a VM provisioning, is transmitted to an Edge Cloud Manager (ECM). A first EC-RAN VM control command Ack message is received that includes information indicating whether a VM host, which the first EC-RAN VM control command message targets, accepts or rejects the first EC-RAN VM control command message, and that includes a VM instance Identifier (ID) allocated to the VM host, as a response message to the first EC-RAN VM control command message, from the ECM. A VM instance corresponding to the VM instance ID is registered and a status of the VM instance is set as an allocation status, after the first EC-RAN VM control command Ack message is received from the ECM.

In accordance with another aspect of an embodiment of the present invention, a method is provided for managing a VM by an ECM in a mobile communication system. A first EC-RAN control command message, indicating that an ECMC commands a VM provisioning according to a reception of a VM provisioning request message from a $3^{rd}$ party entity, is received from the ECMC. A first EC-RAN VM control command Ack message, which includes information indicating that a VM host, which the first EC-RAN VM control command message targets, accepts or rejects the first EC-RAN VM control command message, and includes a VM instance ID allocated to the VM host, is transmitted to the ECME as a response message to the first EC-RAN VM control command message. The ECMC registers a VM instance corresponding to the VM instance ID and sets a status of the VM instance to an allocation status.

In accordance with another aspect of an embodiment of the present invention, a method is provided for managing a VM by a VM host in a mobile communication system. A first ECM command message, which commands a VM preparation operation, is received from an ECM. A preparation operation for starting a VM instance is performed, after receiving the first ECM command message. A first ECM command Ack message is transmitted, as a response message to the first ECM command message, to the ECM, after performing the preparation operation for starting the VM instance.

In accordance with another aspect of an embodiment of the present invention, an ECMC is provided in a mobile communication system. The ECMC includes a transmitter for transmitting a first EC-RAN VM control command message indicating that the ECMC commands a VM provisioning to an ECM upon receiving a VM provisioning request message from a $3^{rd}$ party entity. The ECMC also includes a receiver for receiving a first EC-RAN VM control command Ack message including information indicating whether a VM host, which the first EC-RAN VM control command message targets, accepts or rejects the first EC-RAN VM control command message, and including a VM instance ID allocated to the VM host, as a response message to the first EC-RAN VM control command message, from the ECM. The ECMC further includes a controller for registering a VM instance corresponding to the VM instance ID and setting a status of the VM host instance as an allocation status, after receiving the first EC-RAN VM control command Ack message from the ECM.

In accordance with another aspect of an embodiment of the present invention, an ECM is provided in a mobile communication system. The ECM includes a receiver for receiving a first EC-RAN control command message indicating that an ECMC commands a VM provisioning according to a reception of a VM provisioning request message from a $3^{rd}$ party entity from the ECMC. The ECM also includes a transmitter for transmitting, to the ECMC, a first EC-RAN VM control command Ack message including information indicating that a VM host, which the first EC-RAN VM control command message targets, accepts or rejects the first EC-RAN VM control command message, and including a VM instance ID allocated to the VM host, as a response message to the first EC-RAN VM control command message, thereby the ECMC registers a VM instance corresponding to the VM instance ID and sets a status of the VM instance to an allocation status.

In accordance with another aspect of an embodiment of the present invention, a VM host is provided in a mobile communication system. The VM host includes a receiver for receiving a first ECM command message, which commands a VM preparation operation from an ECM. The VM host also includes a controller for performing a preparation operation for starting a VM instance, after receiving the first ECM command message. The VM host further includes a transmitter for transmitting a first ECM command Ack message, as a response message to the first ECM command message, to the ECM, after performing the preparation operation for starting the VM instance.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION EMBODIMENTS OF THE PRESENT INVENTION

Figure 1:
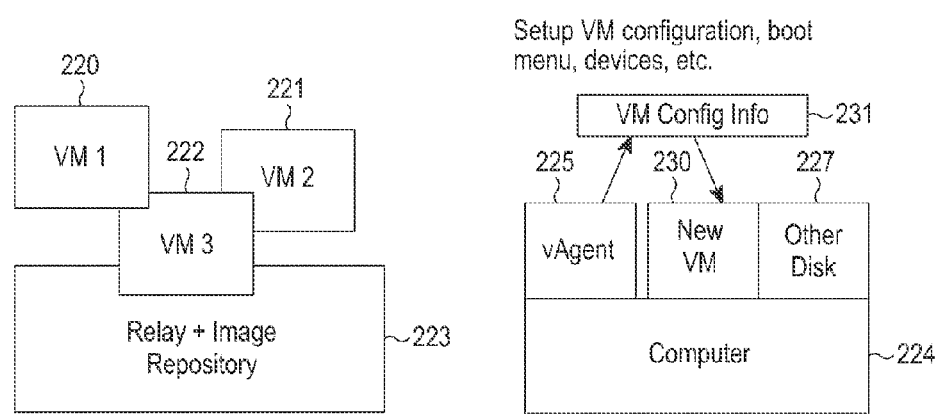
FIG. 1 is a diagram illustrating an end point hosted hypervisor management process in a mobile communication system.
Figure 2:
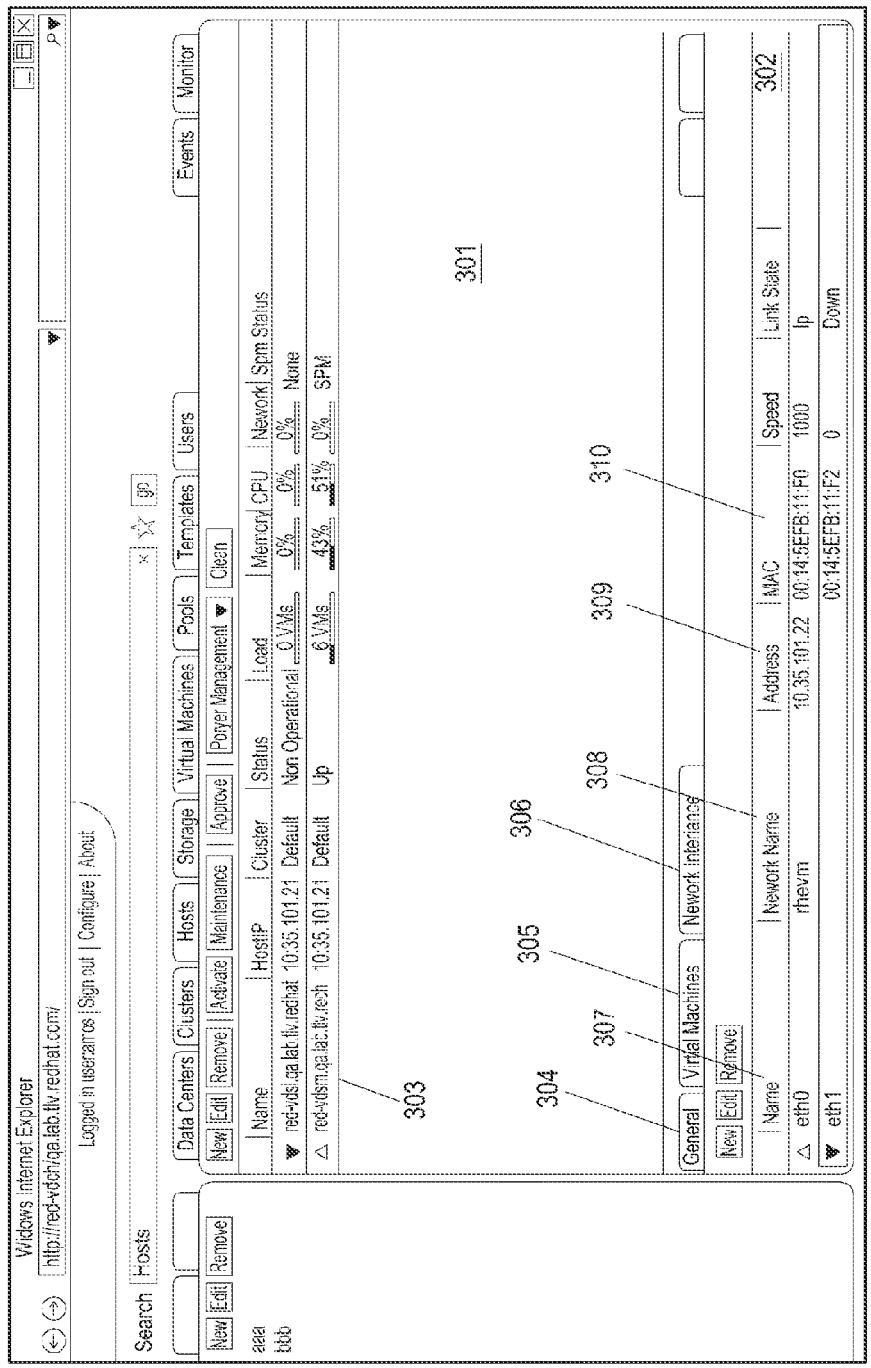
FIG. 2 schematically illustrates a GUI of an automatic install process of a virtualization host in a mobile communication system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used by the inventor to enable a clear and consistent understanding of embodiments of the present invention. Accordingly, it should be apparent to those skilled in the art that the following description of various embodiments of the present invention is provided for illustration purpose only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first", "second", and so forth will be used to describe various components, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the term "has" when used in this specification, specifies the presence of stated feature, number, step, operation, component, element, or a combination thereof, but does not preclude the presence or addition of one or more other features, numbers, steps, operations, components, elements, or combinations thereof.

An apparatus and a method proposed in an embodiment of the present invention will be described with reference to an EPS. Further, an apparatus and method proposed in an embodiment of the present invention may be applied to various mobile communication systems such as a Long Term Evolution (LTE) mobile communication system, a Long Term Evolution-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a $3^{rd}$ Generation Project Partnership 2 (3GPP2), a Wideband Code Division Multiple Access (WCDMA) mobile communication system proposed in a 3GPP2, a Code Division Multiple Access (CDMA) mobile communication system proposed in a 3GPP2, and an Institute of Electrical and Electronics Engineers (IEEE) mobile communication system.

Figure 3:
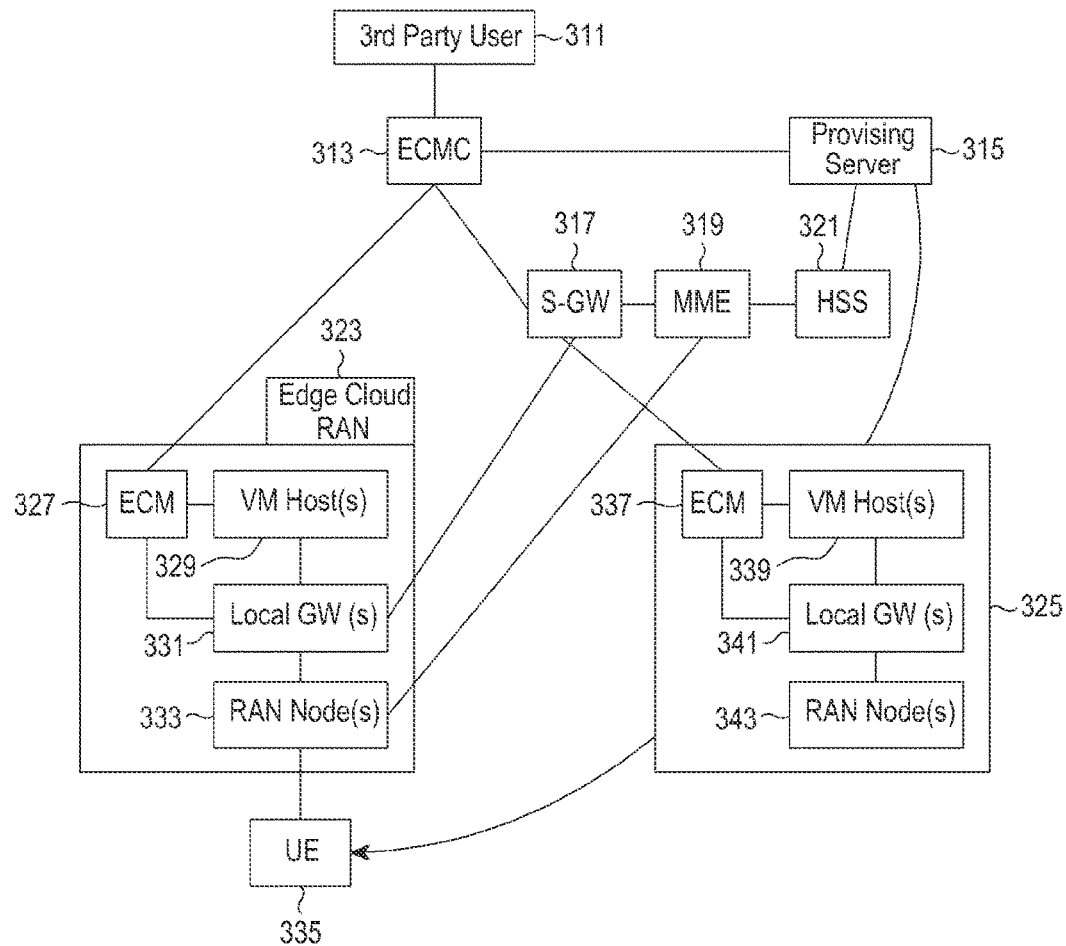
FIG. 3 is a diagram illustrating an internal structure of an Evolved Packet System (EPS), according to an embodiment of the present invention.

FIG. 3 is a diagram illustrating an internal structure of an EPS, according to an embodiment of the present invention.

Referring to FIG. 3, the EPS includes a 3rd party entity 311, an ECMC 313, a provisioning server 315, an S-GW 317, an MME 319, a Home Subscriber Server (HSS) 321, Edge Cloud-Radio Access Networks (EC-RANs) 323, 325, and a UE 335.

The EC-RAN 323 includes an ECM 327, a VM host 329, a L-GW 331, and a RAN node 333. For example, the RAN node 333 may be an eNB. In FIG. 3, one VM host, one L-GW, and one RAN node are included in the EC-RAN 323, however, the EC-RAN 323 may include a plurality of VM hosts, a plurality of L-GWs, and a plurality of RAN nodes.

The EC-RAN 325 includes an ECM 337, a VM host 339, a L-GW 341, and a RAN node 343. For example, the RAN node 343 may be an eNB. In FIG. 3, one VM host, one L-GW, and one RAN node are included in the EC-RAN 325, however, the EC-RAN 325 may include a plurality of VM hosts, a plurality of L-GWs, and a plurality of RAN nodes.

Further, it is assumed that a mobile communication system in FIG. 3 uses a Local network IP Access (LIPA) scheme or a Selected IP Traffic Offload (SIPTO) scheme.

As illustrated in FIG. 3, VM hosts are located a relatively short distance from a L-GW, and there are ECMs that manage the VM hosts. Specifically, there are an ECM, a VM host, a L-GW, and a RAN node in a cell site. A network that is configured in this manner is referred to as an EC-RAN.

As illustrated in FIG. 3, there may be a plurality of EC-RANs. The ECMC 313 centrally manages ECMs that are located at each EC-RAN by connecting the ECMs through an IP network. The ECMC 313 provides a Graphic User Interface (GUI) to the $3^{rd}$ party entity 311. The $3^{rd}$ party entity 311 denotes an entity that intends to deploy a VM at a related region.

The EMCM 313 controls the VM hosts 329, 339 through the ECMs 327, 337, and manages EC-RANs 323, 325, which collect usage/status report information from the ECMs 327, 337.

Each of the VM hosts 329, 339 is a node that may execute one or more VM instances. Each of the VM hosts 329, 339 may perform hosting for a $3^{rd}$ party service, such as a VM instance. Hardware of each of the VM hosts 329, 339 is generally based on a x86-based machine. Virtualization techniques are used for calculating resources such as, for example, a Central Processing Unit (CPU), a memory, a volume (disk), an image, a network, etc. Further, information related to each VM instance is provisioned with information related to a VM resource. The information related to the VM resource includes parameters including a CPU type, the number of CPUs, a memory size, a volume size, an image type, a network type, etc. Each VM instance may be managed by the ECMs 327, 337, and may be provisioned with information related to a VM resource, information related to start (power-on), information related to stop, information related to pause (shutdown), information related to resume, and information related to network configuration.

The ECMs 327, 337 provision information related to the VM hosts 329, 339, and manage life cycles of the VM hosts 329, 339. The ECMs 327, 337 perform the following functions.

(1) VM instance scheduling for the VM hosts 329, 339 included in the EC-RANs 323, 325.

(2) VM network configuration based on a network type of a VM instance.

(3) management for a virtual connection (internal connection) between a VM network and a LA PDN.

(4) status report for VM resources allocated to the ECMC 313.

(5) usage report for how much VM resources are used for the EMCM 313.

Figure 4:
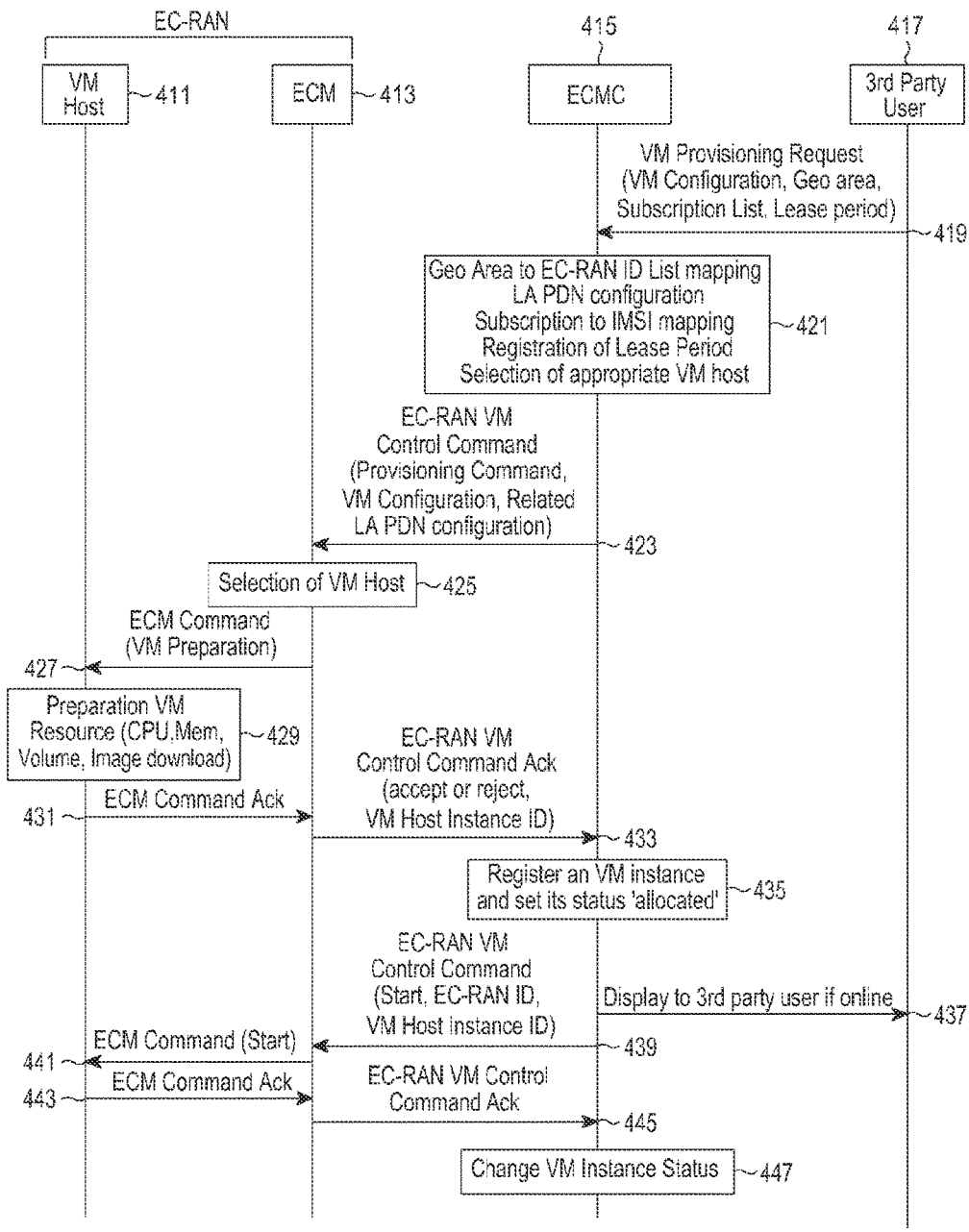
FIG. 4 is a diagram illustrating a VM host provisioning process in an EPS, according to an embodiment of the present invention.

FIG. 4 is a diagram illustrating a VM host provisioning process in an EPS, according to an embodiment of the present invention.

Referring to FIG. 4, the EPS includes a VM host 411, an ECM 413, an ECMC 415, and a $3^{rd}$ party entity 417. The VM host 411 and the ECM 413 are included in an EC-RAN.

If the $3^{rd}$ party entity 417 intends to install a VM instance in an arbitrary area, the $3^{rd}$ party entity 417 uses a GUI of the ECMC 415 or a web Application Programming Interface (API) in order to provide information such as, for example, information related to a VM configuration, area information, a subscription list, and a lease period for a VM. Specifically, the $3^{rd}$ party entity 417 transmits a VM provisioning request message to the EMCM 415, in step 419. The VM provisioning request message includes information that the $3^{rd}$ party entity 417 intends to provision, i.e., information related to VM configuration, area information, a subscription list, and a lease period.

After receiving the VM provisioning request message from the $3^{rd}$ party entity 417, the EMCM 415 detects EC-RAN IDs from a database, which the ECMC 415 manages, and generates an EC-RAN VM control command message and parameters included in the EC-RAN VM control command message, in step 421. The database stores a relationship among the arbitrary area and the EC-RAN IDs. The ECMC 415 transmits the generated EC-RAN VM control command message to the ECM 413, in step 423. The EC-RAN VM control command message includes a provisioning command parameter, a VM configuration parameter, and an associated LA PDN configuration parameter.

After receiving the EC-RAN VM control command message from the ECMC 415, the ECM 413 checks a resource load of VM hosts that the ECM 413 manages, and selects one of the VM hosts, in step 425. The ECM 413 transmits an ECM command message to the VM host 411, in step 427. The ECM command message includes VM preparation information, and the VM preparation information includes parameters such as a CPU type, a memory size, and a VM image to be installed.

After receiving the ECM command message from the ECM 413, the VM host 411 performs a preparation operation for starting a new VM, which is generated using the VM preparation information included in the ECM command message, in step 429. The preparation operation for starting the new VM denotes a VM allocation operation for starting a VM instance corresponding to the CPU type and the memory size included in the VM preparation information, a disk volume, an Operating System (OS) type, and an OS version. After performing the preparation operation for starting the new VM, the VM host 411 transmits an ECM command Ack message as a response message to the ECM command message to the ECM 413, in step 431.

After receiving the ECM command Ack message from the VM host 411, the ECM 413 transmits an EC-RAN VM control command Ack message as a response message to the EC-RAN VM control command message to the ECMC 415, in step 433. The EC-RAN VM control command Ack message includes an accept code indicating acceptance for the EC-RAN VM control command message or a reject code indicating rejection for the EC-RAN VM control command message, and an allocated VM host instance ID. The VM host instance ID is included in the EC-RAN VM control command Ack message if the accept code is included in the EC-RAN VM control command Ack message. Specifically, the EC-RAN VM control command Ack message does not include the VM host instance ID if the reject code is included in the EC-RAN VM control command Ack message.

After receiving the EC-RAN VM control command Ack message from the ECM 413, the ECMC 415 sets status of a VM instance corresponding to the VM host instance ID included in the EC-RAN VM control command Ack message to 'allocated', and registers the VM instance of which status is set to 'allocated' to a storage included in the ECMC 415, in step 435. If the status of the $3^{rd}$ party entity 415 is on line, the ECMC 415 displays a VM provisioning completion to the $3^{rd}$ party entity 415 using a GUI, in step 437. The ECMC 415 transmits an EC-RAN VM control command message to the ECM 413, in step 439. The EC-RAN VM control command message includes a start code, an EC-RAN ID, and a VM host instance ID.

After receiving the EC-RAN VM control command message from the ECMC 415, the ECM 413 transmits an ECM command message to the VM host 411, in step 441. The ECM command message includes a start code.

After receiving the ECM command message from the ECM 413, the VM host 411 transmits an ECM command Ack message as a response message to the ECM command message to the ECM 413, in step 433. After receiving the ECM command Ack message from the VM host 411, the ECM 413 transmits an EC-RAN VM control command Ack message as a response message to the EC-RAN VM control command message to the ECMC 415, in step 445. After receiving the EC-RAN VM control command Ack message from the ECM 413, the ECMC 415 changes a status of a VM instance, in step 447.

A provisioning process for VM hosts in FIG. 4 includes an operating process for each entity included in an EPS in which an ECMC provisions information on one or more VM instances to an EC-RAN, if a $3^{rd}$ party entity is registered to a VM host service through a user interface.

Figure 5:
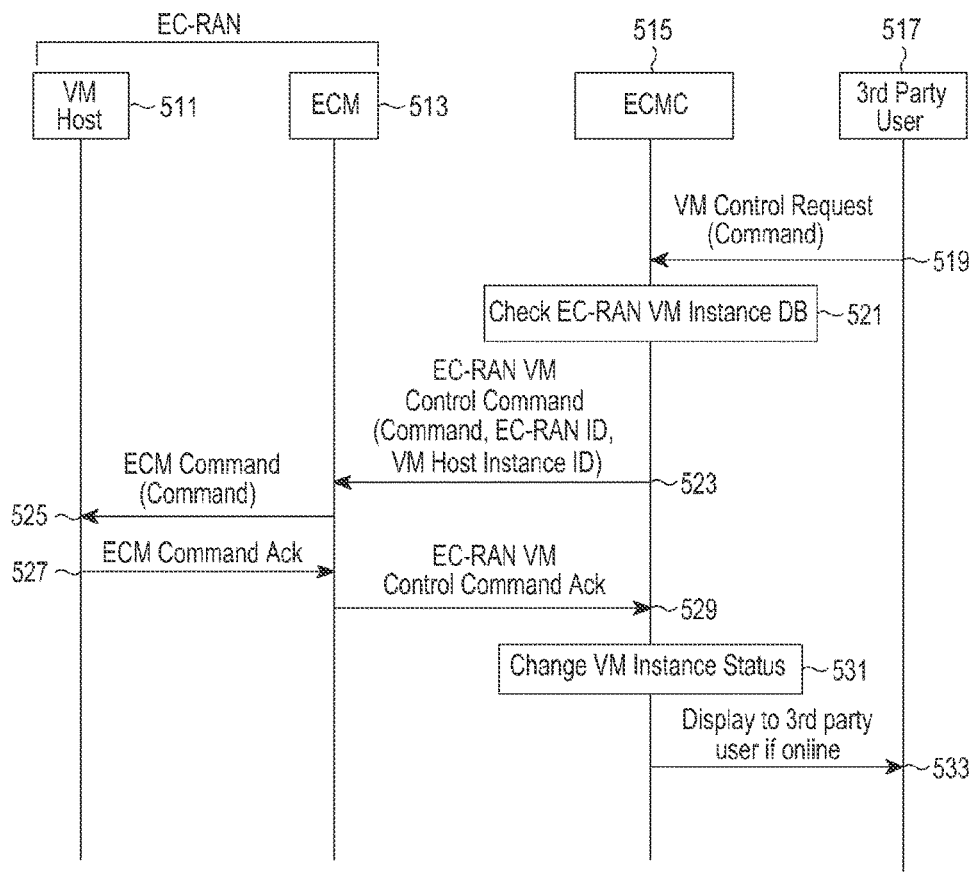
FIG. 5 is a diagram illustrating a life cycle management process in an EPS, according to an embodiment of the present invention.

FIG. 5 is a diagram illustrating a life cycle management process in an EPS, according to an embodiment of the present invention.

Referring to FIG. 5, the EPS includes a VM host 511, an ECM 513, an ECMC 515, and a $3^{rd}$ party entity 517. The VM host 511 and the ECM 513 are included in an EC-RAN.

If the $3^{rd}$ party entity 517 intends to manage a VM instance for an arbitrary area, the $3^{rd}$ party entity 517 uses a GUI of the ECMC 515 or a web API. Specifically, the $3^{rd}$ party entity 517 transmits a VM control request message to the ECMC 515, in step 519. The VM control request message includes a command parameter. The command parameter indicates one of a start command, a pause command, a shutdown command, and a resume command for the VM instance. The start command commands to start the VM instance, the pause command commands to pause the VM instance, the shutdown command commands to shutdown the VM instance, and the resume command commands to resume the VM instance.

After receiving the VM control request message from the $3^{rd}$ party entity 517, the ECMC 515 detects EC-RAN IDs, and checks an EC-RAN VM instance database in order to check a command parameter included in the VM control request message, in step 521. The ECMC 515 transmits an EC-RAN VM control command message to the ECM 513, in step 523. The EC-RAN VM control command message includes a command parameter, an EC-RAN ID, and a VM host instance ID.

After receiving the EC-RAN VM control command message from the ECMC 515, the ECM 513 transmits an ECM command message to the VM host 511, in step 525. The ECM command message includes a command parameter. After receiving the ECM command message from the ECM 513, the VM host 511 processes the command parameter for the VM instance included in the ECM command message, and transmits an ECM command Ack message to the ECM 513, in step 527.

After receiving the ECM command Ack message from the VM host 511, the ECM 513 transmits an EC-RAN VM control command Ack message as a response message to the EC-RAN VM control command message to the ECMC 515, in step 529. After receiving the EC-RAN VM control command Ack message from the ECM 513, the ECMC 515 changes a status of the VM instance, in step 531. If the status of the $3^{rd}$ party entity 517 is on line, the ECMC 515 controls the $3^{rd}$ party entity 517 to display a completion of a VM command using a GUI of the $3^{rd}$ party entity 517, in step 533.

In a life cycle management process in FIG. 5, if a $3^{rd}$ party entity or a network operator intends to change status of a VM instance, the $3^{rd}$ party entity or the network operator uses a GUI or a web API of an ECMC in order to manage a VM instance life cycle. Supported commands include a start command, a stop command, a resume command, a pause command, a snapshot storage command, etc. A VM instance ID includes an EC-RAN ID, a VM host ID, and an instance number which identifies a VM instance on a VM in an EC-RAN.

Figure 6:
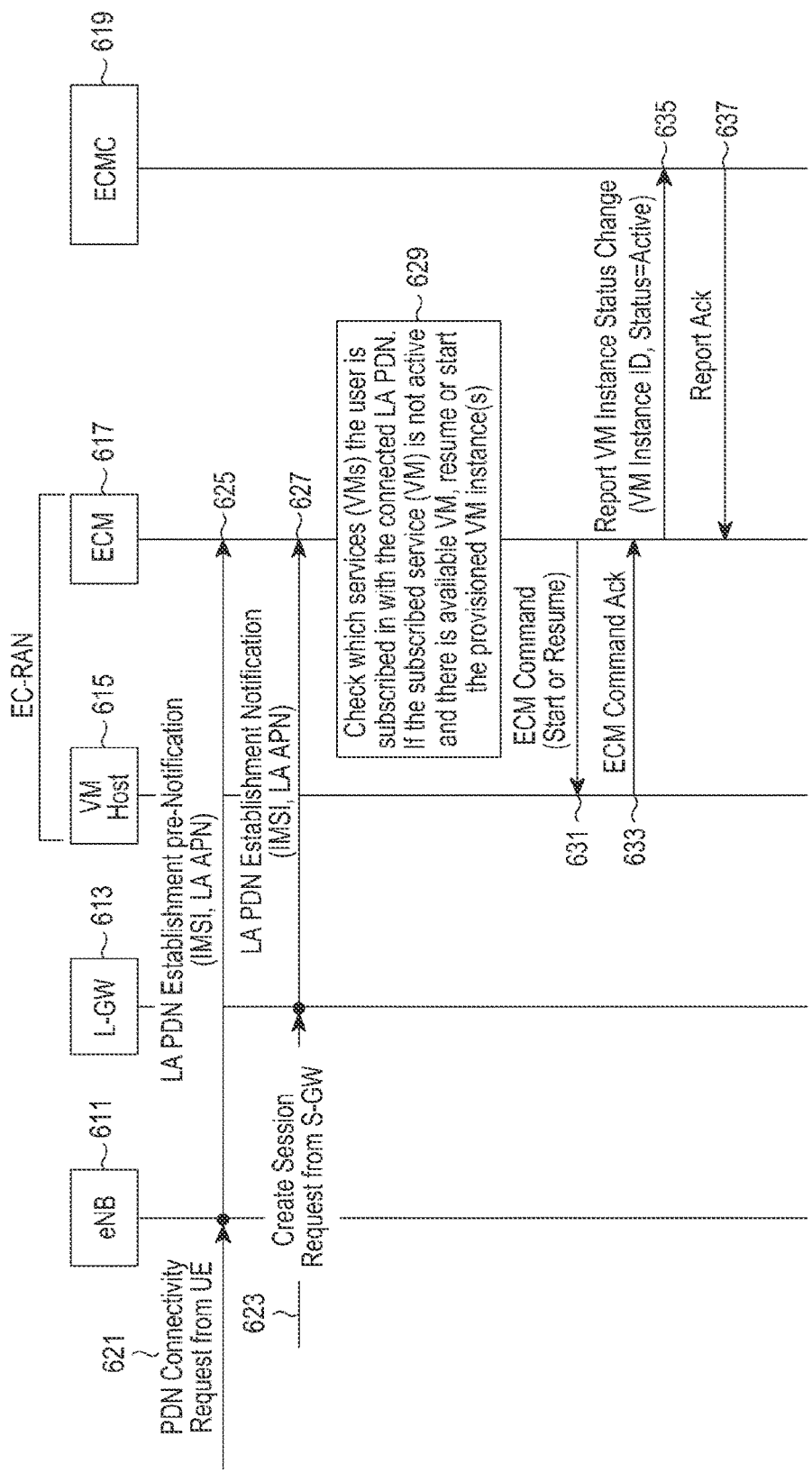
FIG. 6 is a diagram illustrating a Local Access Packet Data Network (LA PDN) establishment notification/VM activation process in an EPS, according to an embodiment of the present invention.

FIG. 6 is a diagram illustrating an LA PDN establishment notification/VM activation process in an EPS, according to an embodiment of the present invention.

Referring to FIG. 6, the EPS includes an eNB 611, an L-GW 613, a VM host 615, an ECM 617, and an ECMC 619. The VM host 615 and the ECM 617 are included in an EC-RAN.

If a UE that is subscribed to a $3^{rd}$ service, which operates a VM instance of a VM host, moves to a service area of an EC-RAN, the UE and the EPS perform a PDN activation process. If the eNB 611 receives a PDN Connection Request message from the UE in step 621, the eNB 611 detects that the UE moves to the service area of the EC-RAN. If the L-GW 613 receives a create session request message from a S-GW in step 623, the L-GW 613 detects that the UE moves to the service area of the EC-RAN.

During the PDN activation process, the eNB 611 or the L-GW 613 transmits a LA PDN establishment pre-notification message, including a UE ID and PDN information, to the ECM 617, in steps 625 and 627. The UE ID may be an IMSI, and the PDN information may be an Access Point Name (APN). For example, each of the LA PDN establishment pre-notification messages in steps 625 and 627 includes an IMSI and a LA APN.

After receiving the LA PDN establishment pre-notification message from the eNB 611 or the L-GW 613, the ECM 617 determines which services, i.e., which VM instances are subscribed in a connection PDN. If the subscribed service (VM instance) is inactive and there are available VM resources, the ECM 617 determines to activate the subscribed VM instances. Specifically, the ECM 617 determines to resume or start provisioned VM instances, in step 629. After determining to activate the VM instances, the ECM 617 transmits an ECM command message, which commands to activate the VM instances, to the VM host 615, in step 631. The activation of the VM instances denotes the start or resuming of the VM instances.

After receiving the ECM command message from the ECM 617, the VM host 615 activates the VM instances and transmits an ECM command Ack message as a response message to the ECM command message to the ECM 617, in step 633. After receiving the ECM command Ack message from the VM host 615, the ECM 617 detects that status of the VM instances are changed and transmits a VM instance status change report message indicating that the status of the VM instances are changed to the ECMC 619, in step 635. The VM instance status change report message includes a VM instance ID and a status parameter indicating status information, and the status parameter indicates active status (status=active). After receiving the VM instance status change report message from the ECM 617, the ECMC 619 transmits a report Ack message as a response message to the VM instance status change report message to the ECM 617, in step 637.

Specifically, the LA PDN establishment notification/VM activation process in FIG. 6 includes a process in which a LA PDN connection for a UE, which is subscribed to a VM (service), is established if a LA PDN establishment is notified or pre-notified, and an ECM starts or resumes a VM instance if the subscribed VM (service) is stopped or is not yet started.

Figure 7:
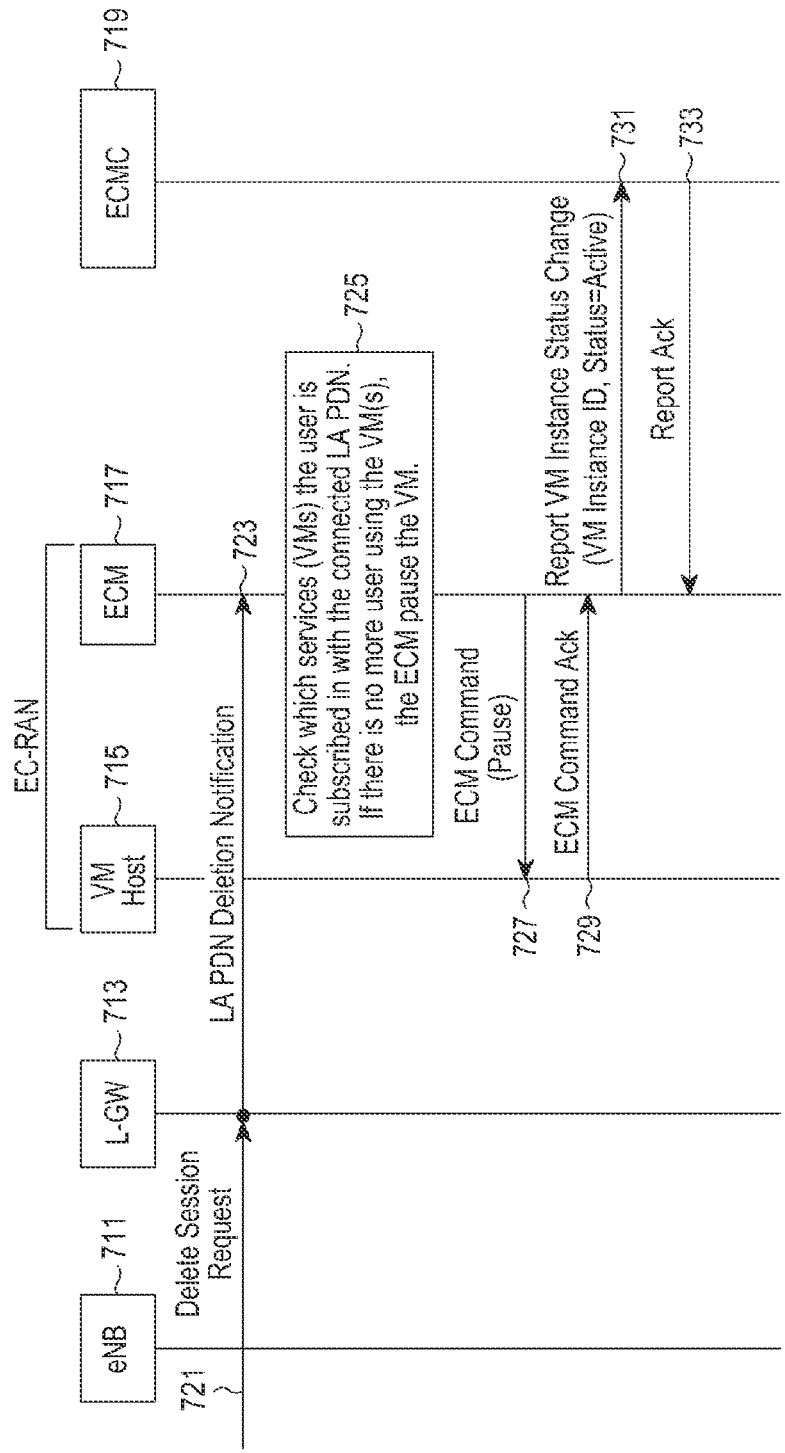
FIG. 7 is a diagram illustrating a LA PDN deletion notification/VM pause process in an EPS, according to an embodiment of the present invention.

FIG. 7 is a diagram illustrating an LA PDN deletion notification/VM pause process in an EPS, according to an embodiment of the present invention.

Referring to FIG. 7, the EPS includes an eNB 711, an L-GW 713, a VM host 715, an ECM 717, and an ECMC 719. The VM host 715 and the ECM 717 are included in an EC-RAN.

If a UE moves out of a service area of an EC-RAN, an EPC network notifies the ECM 717 that the UE moves out of the service area of the EC-RAN, in step 723. For example, if the L-GW 713 detects that the UE moves out of the service area of the EC-RAN according to a reception of a delete session request message, in step 721, the L-GW 713 transmits an LA PDN deletion notification message to the ECM 717 in order to notify the ECM 717 that the UE moves out of the service area of the EC-RAN, in step 723.

After receiving the LA PDN Deletion Notification message from the L-GW 713, the ECM 717 checks the services (VMs) that a user, i.e., the UE, is subscribed to. If there is no user connected to the VM(s), the ECM 717 determines to stop the VM instance in order to save a resource of the VM host 715, in step 725. After determining to stop the VM instance, the ECM 717 transmits an ECM Command message, which commands to stop the VM instance to the VM host 715, in step 727. The ECM Command message includes a stop parameter.

After receiving the ECM command message from the ECM 717, the VM host 715 transmits an ECM command Ack message as a response message to the ECM command message to the ECM 717, in step 729. After receiving the ECM command Ack message from the VM host 715, the ECM 717 transmits a VM instance status change report message to the ECMC 719, in step 731. The VM instance status change report message includes a VM instance ID and a status parameter indicating status information. The status parameter indicates a paused status (status=paused). After receiving the VM instance status change report message from the ECM 717, the ECMC 719 transmits a report Ack message as a response message to the VM instance status change report message to the ECM 717, in step 733.

Specifically, the LA PDN deletion notification/VM pause process in FIG. 7 includes a process in which a LA PDN connection for a UE, which is subscribed to a VM (service), is deleted if a LA PDN deletion is notified, and an ECM stops the VM if there is no UE that uses the VM.

Figure 8:
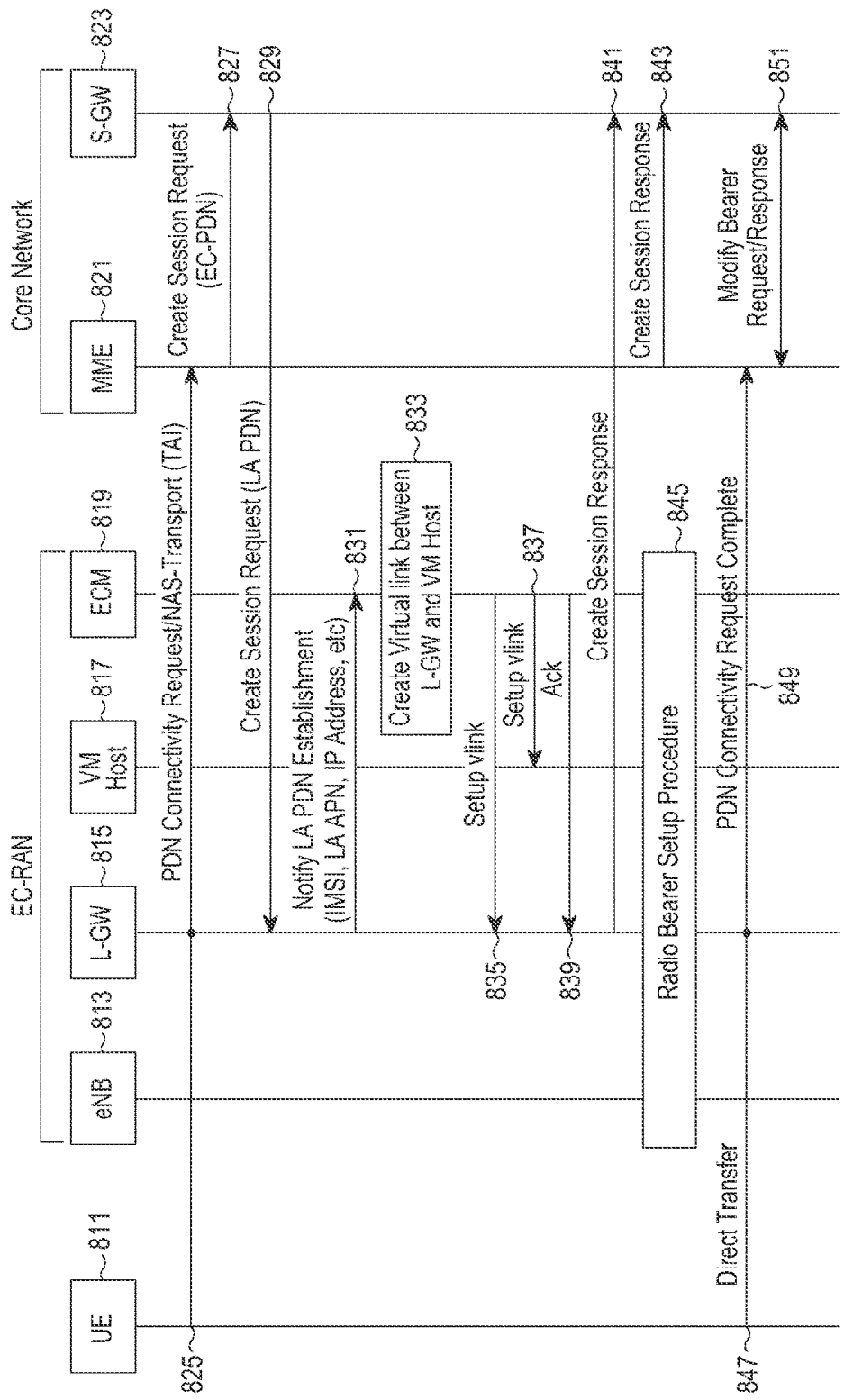
FIG. 8 is a diagram illustrating a process of linking a VM instance to a LA PDN connection in an EPS, according to an embodiment of the present invention.

FIG. 8 is a diagram illustrating a process of linking a VM instance to a LA PDN connection in an EPS, according to an embodiment of the present invention.

Referring to FIG. 8, the EPS includes a UE 811, an eNB 813, a L-GW 815, a VM host 817, an ECM 819, an MME 821, and a S-GW 823. The eNB 813, the L-GW 815, the VM host 817, and the ECM 819 are included in an EC-RAN. The MME 821 and the S-GW 823 are included in a core network.

If the L-GW 815 completes a LA PDN connection establishment, the L-GW 815 notifies the ECM 819 of the completion of the LA PDN connection establishment, as described in detail below.

The UE 811 transmits a PDN connectivity request/Network Access Server (NAS)-transport message to the MME 821 through the L-GW 815, in step 825. The PDN connectivity request/NAS-transport message includes a Tracking Area Identity (TAI).

After receiving the connectivity request/NAS-transport message from the L-GW 815, the MME 821 transmits a create session request message to the S-GW 823, in step 827. The create session request message includes LA PDN information. After receiving the create session request message from the MME 821, the S-GW 823 transmits a create session request message to the L-GW 815, in step 829. The create session request message transmitted in step 829 also includes LA PDN information. The LA PDN information includes an APN, a PDN type, protocol configuration options, a request type, and a tracking area list.

After receiving the create session request message from the S-GW 823, the L-GW 815 performs an LA PDN connection establishment procedure, and transmits a notify LA PDN establishment message to the ECM 819, indicating that the LA PDN connection establishment procedure has been completed, after performing the LA PDN connection establishment procedure, in step 831. The notify LA PDN establishment message includes an IMSI of the UE 811, an LA PDN ID, and an IP address.

After receiving the notify LA PDN establishment message from the L-GW 815, the ECM 819 creates a virtual link between the L-GW 815 and the VM host 817, in step 833. The ECM 819 creates the virtual link between the L-GW 815 and the VM host 817 using a Virtual LAN (VLAN) tag or a Virtual Private Network (VPN) tunnel. After creating the virtual link between the L-GW 815 and the VM host 817, the ECM 819 transmits a setup virtual link message to each of the L-GW 815 and the VM host 817, in steps 835 and 837. The ECM 819 transmits an Ack message to the L-GW 815, in step 839.

After receiving the Ack message from the ECM 819, the L-GW 815 transmits a create session response message to the create session request message to the S-GW 823, in step 841. After receiving the create session response message from the L-GW 815, the S-GW 823 transmits a create session response message to the MME 821, in step 843. After the MME 831 receives the create session response message from the S-GW 823, a radio bearer setup procedure is performed between the UE 811 and the MME 821, in step 845.

After the radio bearer setup procedure between the UE 811 and the MME 821 is completed, the UE 811 transmits a direct transfer message to the L-GW 815, in step 847. After receiving the direct transfer message from the UE 811, the L-GW 815 transmits a PDN connectivity complete message as a response message to the PDN connectivity request message to the MME 821, in step 849. After receiving the PDN connectivity complete message from the L-GW 815, the MME 821 performs a Modify Bearer Request/Response procedure with the S-GW 823, in step 851.

Specifically, the process of linking the VM instance to the LA PDN connection in FIG. 8 is established on a L-GW, and a (internal) virtual private connection between the VM instance and the L-GW is established.

Figure 9:
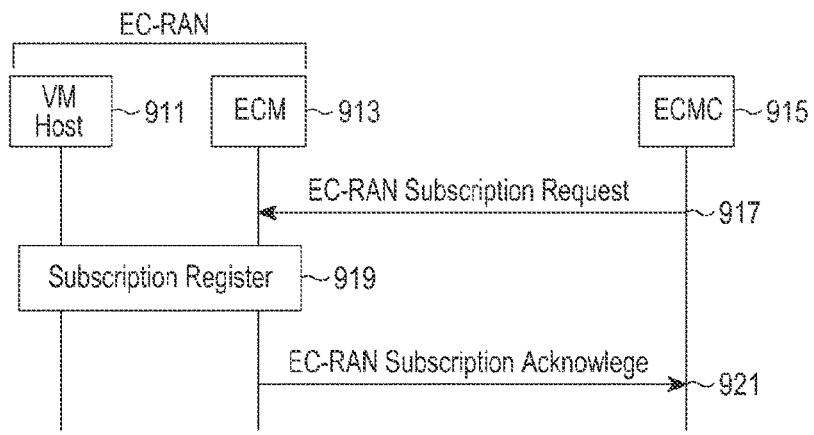
FIG. 9 is a diagram illustrating an event subscription process in an EPS, according to an embodiment of the present invention.

FIG. 9 is a diagram illustrating an event subscription process in an EPS, according to an embodiment of the present invention.

Referring to FIG. 9, the EPS includes a VM host 911, an ECM 913, and an ECMC 915. The VM host 911 and the ECM 913 are included in an EC-RAN.

The ECMC 915 may subscribe to a usage and an event report for a VM instance. The ECMC 915 transmits an EC-RAN subscription request message to the ECM 913, if necessary, in step 917. The EC-RAN subscription request message includes a reporting period and a threshold value on reporting categories. For example, the threshold value may be set to a CPU usage rate of 90% or a disk usage rate of 90%.

After receiving the EC-RAN subscription request message from the ECMC 915, the ECM 913 performs a subscription register procedure with the VM host 911, in step 919. After performing the subscription register procedure with the VM host 911, the ECM 913 transmits an EC-RAN subscription Ack message to the ECMC 915, in step 921. The EC-RAN subscription Ack message includes information required from the ECMC 915, such as, for example, a usage of a VM instance including a CPU and a memory and a network & VM status change event.

Figure 10:
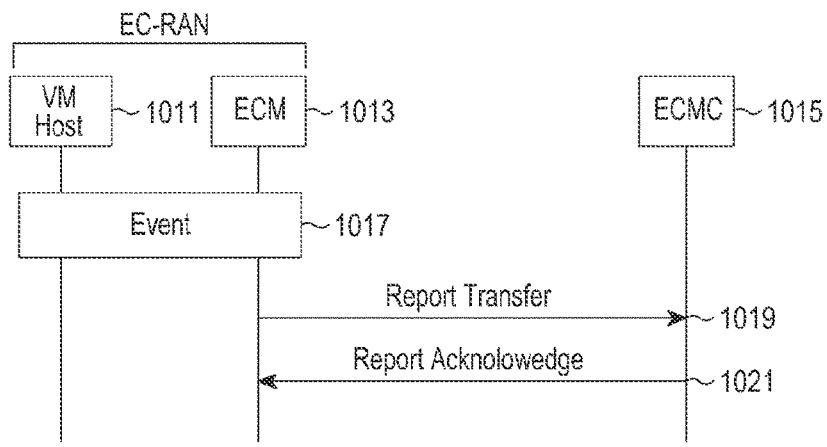
FIG. 10 is a diagram illustrating an event report process in an EPS, according to an embodiment of the present invention.

FIG. 10 is a diagram illustrating an event report process in an EPS, according to an embodiment of the present invention.

Referring to FIG. 10, the EPS includes a VM host 1011, an ECM 1013, and an ECMC 1015. The VM host 1011 and the ECM 1013 are included in an EC-RAN.

The VM host 1011 and the ECM 1013 perform an event registration procedure, in step 1017. After performing the event registration procedure, the ECM 1013 periodically reports registered information such as a status change event to the ECMC 1015, or reports the registered information to the ECMC 1015 if a CPU usage criterion that is greater than a threshold value is repeated, in step 1019. The report operation is performed using a report transfer message. The event reporting process of FIG. 9 is a one-time solicit status report process. If a severe event such as an abnormal VM crash occurs, the ECM 1013 reports the occurred severe event to the ECMC 1015.

After receiving the report transfer message from the ECM 1013, the ECMC 1015 transmits a report Ack message as a response message to the report transfer message to the ECM 1013, in step 1021.

Figure 11:
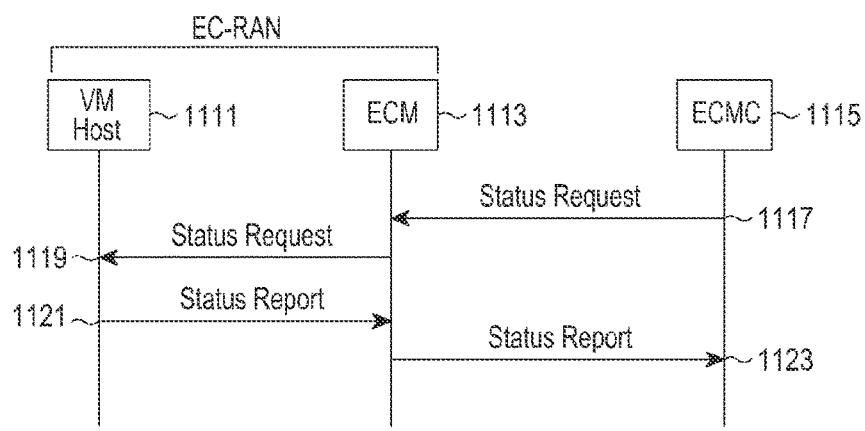
FIG. 11 is a diagram illustrating a solicit status report process in an EPS, according to an embodiment of the present invention.

FIG. 11 is a diagram illustrating a solicit status report process in an EPS, according to an embodiment of the present invention.

Referring to FIG. 11, the EPS includes a VM host 1111, an ECM 1113, and an ECMC 1115. The VM host 1111 and the ECM 1113 are included in an EC-RAN.

If the ECMC 1115 intends to request a solicit status report, the ECMC 1115 transmits a status request message to the ECM 1113, in step 1117. After receiving the status request message from the ECMC 1115, the ECM 1113 transmits a status request message to the VM host 1111, in step 1119. After receiving the status request message from the ECM 1113, the VM host 1111 transmits a status response message as a response message to the status request message to the ECM 1113, in step 1121. After receiving the status response message, the ECM 1113 transmits a status response message to the ECMC 1115, in step 1123. The ECM 1113 reports requested information such as, for example, a usage of a CPU, a memory, and a disk volume, and status of a network or a VM instance, to the ECMC 1115 through the status response message.

Figure 12:
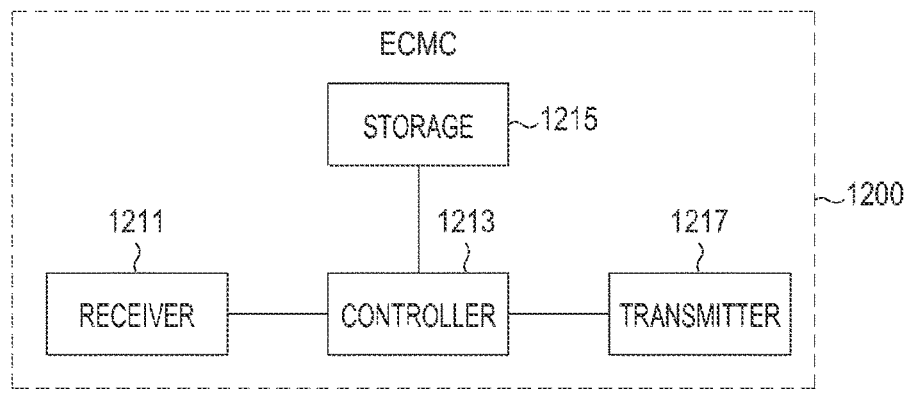
FIG. 12 is a diagram illustrating an internal structure of an ECMC in an EPS, according to an embodiment of the present invention.

FIG. 12 is a diagram illustrating an internal structure of an ECMC in an EPS, according to an embodiment of the present invention.

Referring to FIG. 12, an ECMC 1200 includes a receiver 1211, a controller 1213, a storage 1215, and a transmitter 1217.

The controller 1213 controls the overall operation of the ECMC 1200. In particular, the controller 1213 controls the ECMC 1200 to perform an operation of managing a VM. The operation of managing the VM is performed in the manner described above reference to FIGS. 4 to 11.

The receiver 1211 receives messages under a control of the controller 1213.

The storage 1215 stores the messages received in the receiver 1211 and data necessary for the overall operation of the ECMC 1200.

The transmitter 1217 transmits messages under a control of the controller 1213.

While the receiver 1211, the controller 1213, the storage 1215, and the transmitter 1217 are shown in FIG. 12 as separate units, it is to be understood that this is merely for convenience of description. In other words, two or more of the receiver 1211, the controller 1213, the storage 1215, and the transmitter 1217 may be incorporated into a single unit.

Figure 13:
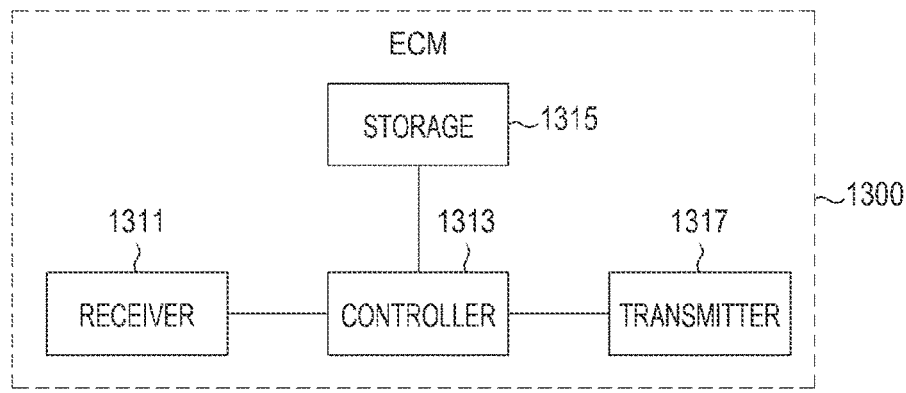
FIG. 13 is a diagram illustrating an internal structure of an ECM in an EPS, according to an embodiment of the present invention.

FIG. 13 is a diagram illustrating an internal structure of an ECM in an EPS, according to an embodiment of the present invention.

Referring to FIG. 13, an ECM 1300 includes a receiver 1311, a controller 1313, a storage 1315, and a transmitter 1317.

The controller 1313 controls the overall operation of the ECM 1300. In particular, the controller 1313 controls the ECM 1300 to perform an operation of managing a VM. The operation of managing the VM is performed in the manner described above with reference to FIGS. 4 to 11.

The receiver 1311 receives messages under a control of the controller 1313.

The storage 1315 stores the messages received in the receiver 1311 and data necessary for the overall operation of the ECM 1300.

The transmitter 1317 transmits messages under a control of the controller 1313.

While the receiver 1311, the controller 1313, the storage 1315, and the transmitter 1317 are shown in FIG. 13 as separate units, it is to be understood that this is merely for convenience of description. In other words, two or more of the receiver 1311, the controller 1313, the storage 1315, and the transmitter 1317 may be incorporated into a single unit.

Figure 14:
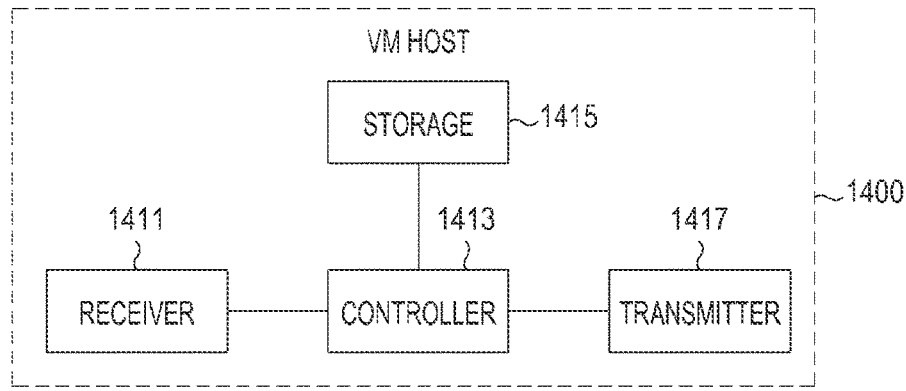
FIG. 14 is a diagram illustrating an internal structure of a VM host in an EPS, according to an embodiment of the present invention.

FIG. 14 schematically illustrates an internal structure of a VM host in an EPS, according to an embodiment of the present invention.

Referring to FIG. 14, a VM host 1400 includes a receiver 1411, a controller 1413, a storage 1415, and a transmitter 1417.

The controller 1413 controls the overall operation of the VM host 1400. In particular, the controller 1413 controls the VM host 1400 to perform an operation of managing a VM. The operation of managing the VM is performed in the manner described above with reference to FIGS. 4 to 11.

The receiver 1411 receives messages under a control of the controller 1413.

The storage 1415 stores the messages received in the receiver 1411 and data necessary for the overall operation of the VM host 1400.

The transmitter 1417 transmits messages under a control of the controller 1413.

While the receiver 1411, the controller 1413, the storage 1415, and the transmitter 1417 are shown in FIG. 14 as separate units, it is to be understood that this is merely for convenience of description. In other words, two or more of the receiver 1411, the controller 1413, the storage 1415, and the transmitter 1417 may be incorporated into a single unit.

Figure 15:
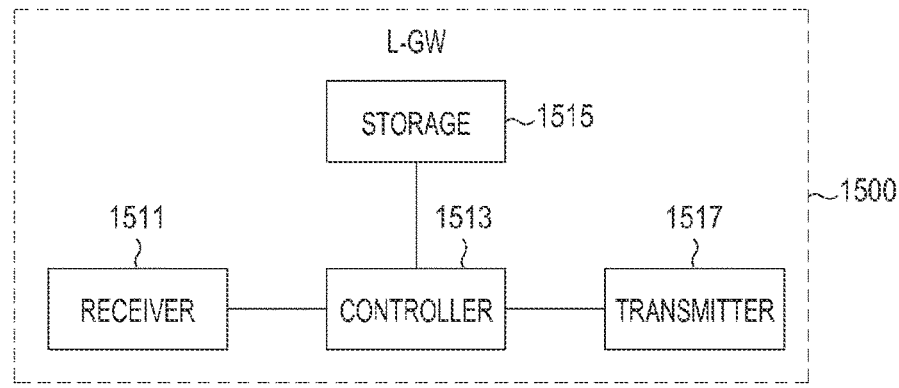
FIG. 15 is a diagram illustrating an internal structure of a Local GateWay (L-GW) in an EPS, according to an embodiment of the present invention.

FIG. 15 is a diagram illustrating an internal structure of a L-GW in an EPS, according to an embodiment of the present invention.

Referring to FIG. 15, a L-GW 1500 includes a receiver 1511, a controller 1513, a storage 1515, and a transmitter 1517.

The controller 1513 controls the overall operation of the L-GW 1500. In particular, the controller 1513 controls the L-GW 1500 to perform an operation of managing a VM. The operation of managing the VM is performed in the manner described before with reference to FIGS. 4 to 11.

The receiver 1511 receives messages under a control of the controller 1513.

The storage 1515 stores the messages received in the receiver 1511 and data necessary for the overall operation of the L-GW 1500.

The transmitter 1517 transmits messages under a control of the controller 1513.

While the receiver 1511, the controller 1513, the storage 1515, and the transmitter 1517 are shown in FIG. 15 as separate units, it is to be understood that this is merely for convenience of description. In other words, two or more of the receiver 1511, the controller 1513, the storage 1515, and the transmitter 1517 may be incorporated into a single unit.

Figure 16:
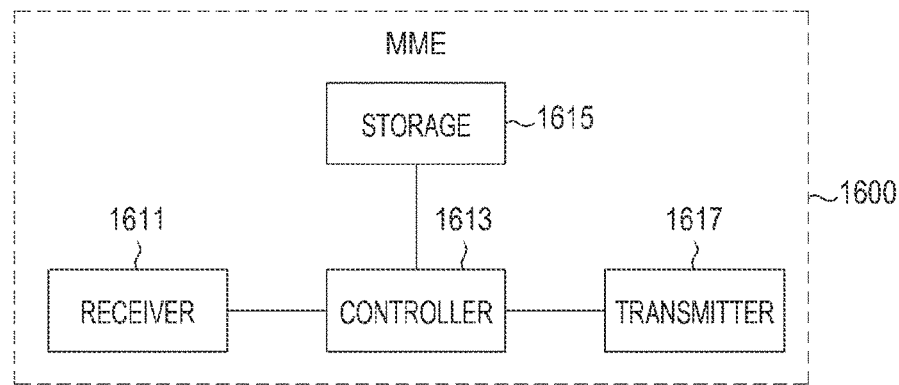
FIG. 16 is a diagram illustrating an internal structure of a Mobility Management Entity (MME) in an EPS, according to an embodiment of the present invention.

FIG. 16 is a diagram illustrating an internal structure of an MME in an EPS, according to an embodiment of the present invention.

Referring to FIG. 16, an MME 1600 includes a receiver 1611, a controller 1613, a storage 1615, and a transmitter 1617.

The controller 1613 controls the overall operation of the MME 1600. In particular, the controller 1613 controls the MME 1600 to perform an operation of managing a VM. The operation of managing the VM is performed in the manner described above with reference to FIGS. 4 to 11.

The receiver 1611 receives messages under a control of the controller 1613.

The storage 1615 stores the messages received in the receiver 1611 and data necessary for the overall operation of the MME 1600.

The transmitter 1617 transmits messages under a control of the controller 1613.

While the receiver 1611, the controller 1613, the storage 1615, and the transmitter 1617 are shown in FIG. 16 as separate units, it is to be understood that this is merely for convenience of description. In other words, two or more of the receiver 1611, the controller 1613, the storage 1615, and the transmitter 1617 may be incorporated into a single unit.

Figure 17:
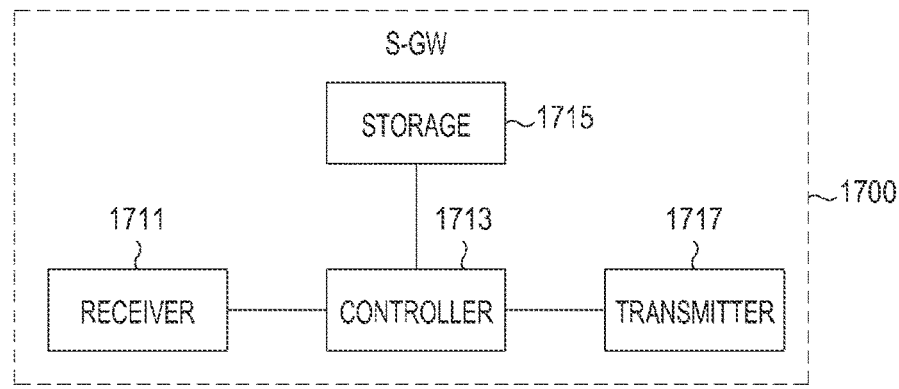
FIG. 17 is a diagram illustrating an internal structure of a Serving GateWay (S-GW) in an EPS, according to an embodiment of the present invention.

FIG. 17 is a diagram illustrating an internal structure of a S-GW in an EPS, according to an embodiment of the present invention.

Referring to FIG. 17, a S-GW 1700 includes a receiver 1711, a controller 1713, a storage 1715, and a transmitter 1717.

The controller 1713 controls the overall operation of the S-GW 1700. In particular, the controller 1713 controls the S-GW 1700 to perform an operation of managing a VM. The operation of managing the VM is performed in the manner described above with reference to FIGS. 4 to 11.

The receiver 1711 receives messages under a control of the controller 1713.

The storage 1715 stores the messages received in the receiver 1711 and data necessary for the overall operation of the S-GW 1700.

The transmitter 1717 transmits messages under a control of the controller 1713.

While the receiver 1711, the controller 1713, the storage 1715, and the transmitter 1717 are shown in FIG. 17 as separate units, it is to be understood that this is merely for convenience of description. In other words, two or more of the receiver 1711, the controller 1713, the storage 1715, and the transmitter 1717 may be incorporated into a single unit.

As is apparent from the foregoing description, an embodiment of the present invention enables management of a VM, thereby increasing resource efficiency in a mobile communication system.

An embodiment of the present invention enables management of a VM, thereby controlling an operation of the VM according to whether a UE accesses a server that is located at the VM in a mobile communication system.

An embodiment of the present invention enables management of a VM by controlling an operation of the VM according to whether a UE accesses a server that is located at the VM, thereby preventing unnecessary operation of the VM and resource waste due to the unnecessary operation of the VM in a mobile communication system.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for managing a virtual machine (VM) by an edge cloud management controller (ECMC) in a mobile communication system, the method comprising:
    upon the ECMC receiving a VM provisioning request message from a third party entity, transmitting, by the ECMC, to an edge cloud manager (ECM) a first edge cloud-radio access network (EC-RAN) VM control command message indicating that the ECMC commands a VM provisioning to the ECM;
    receiving, by the ECMC, a first EC-RAN VM control command Ack message comprising information indicating whether a VM host, the VM host being a target of the first EC-RAN VM control command message, accepts or rejects the first EC-RAN VM control command message, and comprising a VM instance identifier (ID) allocated to the VM host, as a response message to the first EC-RAN VM control command message, from the ECM; and
    registering, by the ECMC, a VM instance corresponding to the VM instance ID and setting a status of the VM instance to allocated to the third party entity, after receiving the first EC-RAN VM control command Ack message from the ECM.

2. The method of claim 1, further comprising:
    controlling, by the ECMC, the third party entity to display completion of the VM provisioning after registering the VM instance.

3. The method of claim 1, further comprising:
    transmitting, by the ECMC, to the ECM a second EC-RAN VM control command message comprising the VM instance ID, an EC-RAN ID, and a start code related to the VM instance, after registering the VM instance;
    receiving, by the ECMC, from the ECM, a second EC-RAN VM control command Ack message indicating that the VM instance has started; and
    changing, by the ECMC, the status of the VM instance to a start status based on the second EC-RAN VM control command Ack message.

4. A method for managing a virtual machine (VM) by an edge cloud manager (ECM) in a mobile communication system, the method comprising:
    receiving, by the ECM, from an EMC controller (ECMC), a first edge cloud-radio access network (EC-RAN) control command message indicating that the ECMC commands a VM provisioning according to a reception of a VM provisioning request message from a third party entity; and
    transmitting, by the ECM, to the ECMC, a first EC-RAN VM control command Ack message comprising information indicating that a VM host, the VM host being a target of the first EC-RAN VM control command message, accepts or rejects the first EC-RAN VM control command message, and comprising a VM instance identifier (ID) allocated to the VM host, as a response message to the first EC-RAN VM control command message, thereby the ECMC registers a VM instance corresponding to the VM instance ID and sets a status of the VM instance to allocated to the third party entity.

5. The method of claim 4, further comprising:
    selecting, by the ECM, the VM host from a plurality of VM hosts based on a resource usage of each of the plurality of VM hosts after receiving the EC-RAN VM control command message from the ECMC; and
    transmitting, by the ECM, an ECM command message including a VM preparation information, to the VM host, thereby the VM host performs the VM preparation operation for starting the VM instance based on the VM preparation information,
    wherein the VM preparation information includes at least one of central processing unit (CPU) type information, memory size information, disk volume information, and operating system type information, related to the VM instance.

6. The method of claim 4, further comprising:
    receiving, by the ECM, a second EC-RAN VM control command message including the VM instance ID, an EC-RAN ID, and a start code after transmitting the first EC-RAN VM control command Ack message to the ECMC; and
    transmitting, by the ECM, a second EC-RAN VM control command Ack message, indicating that the VM instance has started, to the ECMC, thereby the ECMC changes the status of the VM instance to a start status.

7. The method of claim 4, further comprising:
    transmitting, by the ECM, to the VM host, an ECM command message indicating that the ECM commands to start the VM instance, after receiving the EC-RAN VM control command message from the ECMC; and
    receiving, by the ECM, an ECM command Ack message as a response message to the ECM command message from the VM host.

8. A method for managing a virtual machine (VM) by a VM host in a mobile communication system, the method comprising:
    receiving, by the VM host, a first edge cloud manager (ECM) command message including preparation operation information, from an ECM, if the VM host is selected, from a plurality of VM hosts, for a third party entity by the ECM based on a resource usage of the VM host;
    performing, by the VM host, a preparation operation for starting a VM instance based on the preparation operation information, after receiving the first ECM command message; and
    transmitting, by the VM host, a first ECM command Ack message, as a response message to the first ECM command message, to the ECM, after performing the preparation operation for starting the VM instance,
    receiving a second ECM command message, which the ECM transmits according to a reception of an edge cloud-radio access network (EC-RAN) VM control command message, which comprises a VM instance identifier (ID), an EC-RAN ID, and a start code, from an edge cloud management controller (ECMC), after transmitting the first ECM command Ack message; and
    transmitting a second EMC command Ack message, as a response message to the second ECM command message, to the ECM,
    wherein the preparation operation information includes at least one of central processing unit (CPU) type information, memory size information, disk volume information, and operating system type information, related to the VM instance.

9. The method of claim 8, further comprising:
starting the VM instance after receiving the second ECM command message.

10. An edge cloud management controller (ECMC) in a mobile communication system, comprising:
a processor configured to:
transmit a first edge cloud-radio access network (EC-RAN) virtual machine (VM) control command message indicating that the ECMC commands a VM provisioning to an edge cloud manager (ECM) upon receiving a VM provisioning request message from a third party entity,
receive, from the ECM, a first EC-RAN VM control command Ack message comprising information indicating whether a VM host, the VM host being a target of the first EC-RAN VM control command message, accepts or rejects the first EC-RAN VM control command message, and comprising a VM instance identifier (ID) allocated to the VM host, as a response message to the first EC-RAN VM control command message, and
register a VM instance corresponding to the VM instance ID, and setting a status of the VM host instance to allocated to the third party entity, after receiving the first EC-RAN VM control command Ack message from the ECM.

11. The ECMC of claim 10, wherein the processor controls the third party entity to display completion of the VM provisioning after registering the VM instance.

12. The ECMC of claim 10, wherein the processor is further configured to:
transmit, to the ECM, a second EC-RAN VM control command message comprising the VM instance ID, an EC-RAN ID, and a start code related to the VM instance,
receive, from the ECM, a second EC-RAN VM control command Ack message indicating that the VM instance has started, and
change the status of the VM instance to a start status based on the second EC-RAN VM control command Ack message.

13. An edge cloud manager (ECM) in a mobile communication system, comprising:
a processor configured to:
receive, from an EMC controller (ECMC), a first Edge Cloud-Radio Access Network (EC-RAN) control command message indicating that the ECMC commands a Virtual Machine (VM) provisioning according to a reception of a VM provisioning request message from a third party entity, and
transmit, to the ECMC, a first EC-RAN VM control command Ack message comprising information indicating that a VM host, the VM host being a target of the first EC-RAN VM control command message, accepts or rejects the first EC-RAN VM control command message, and comprising a VM instance identifier (ID) allocated to the VM host, as a response message to the first EC-RAN VM control command message, thereby the ECMC registers a VM instance corresponding to the VM instance ID and sets a status of the VM instance to allocated to the third party entity.

14. The ECM of claim 13, wherein the processor is further configured to:
select the VM host from a plurality of VM hosts based on a resource usage of each of the plurality of VM hosts after receiving the EC-RAN VM control command message from the ECMC, and
transmit an ECM command message including a VM preparation information, to the VM host, thereby the VM host performs a preparation operation for starting the VM instance,
wherein the VM preparation information includes at least one of central processing unit (CPU) type information, memory size information, disk volume information, and operating system type information, related to the VM instance.

15. The ECM of claim 13, wherein the processor is further configured to:
receive a second EC-RAN VM control command message including the VM instance ID, an EC-RAN ID, and a start code, after transmitting the first EC-RAN VM control command Ack message to the ECMC, and
transmit an EC-RAN VM control command Ack message, indicating that the VM instance has started to the ECMC, thereby the ECMC changes the status of the VM instance to a start status.

16. The ECM of claim 15, wherein the processor is further configured to:
transmit, to the VM host, an ECM command message indicating that the ECM commands to start the VM instance, after receiving the EC-RAN VM control command message from the ECMC, and
receive an ECM command Ack message as a response message to the ECM command message from the VM host.

17. A virtual machine (VM) host in a mobile communication system, comprising:
a processor configured to:
receive a first edge cloud manager (ECM) command message including preparation operation information, from an ECM, if the VM host is selected, from a plurality of VM hosts, for a third party entity by the ECM based on a resource usage of the VM host, receive a second ECM command message, which the ECM transmits according to a reception of an edge cloud-radio access network (EC-RAN) VM control command message, which comprises a VM instance identifier (ID), an EC-RAN ID, and a start code, from an edge cloud management controller (ECMC),
perform a preparation operation for starting a VM instance based on the preparation operation information, after receiving the first ECM command message, and
transmit a first ECM command Ack message, as a response message to the first ECM command message, to the ECM, after performing the preparation operation for starting the VM instance, transmit a second EMC command Ack message, as a response message to the second ECM command message, to the ECM, and
wherein the preparation operation information includes at least one of central processing unit (CPU) type information, memory size information, disk volume information, and operating system type information, related to the VM instance.

18. The VM host of claim 17, wherein the processor is further configured to:
start the VM instance after receiving the second ECM command message.

* * * * *